United States Patent [19]

Namba et al.

[11] Patent Number: 5,069,980

[45] Date of Patent: Dec. 3, 1991

[54] VACUUM-BRAZING ALUMINUM CLADDING MATERIAL CONSISTING OF AL OR AL ALLOY CORE AND TWO SUPERPOSED ALUMINUM ALLOY CLADS WHICH COVER AT LEAST ONE SURFACE OF THE CORE

[75] Inventors: Keizo Namba; Yasunaga Itoh, both of Nagoya; Hiroshi Nakanishi, Toyohashi, all of Japan

[73] Assignee: Sumitmo Light Metal Industries, Ltd., Tokyo, Japan

[21] Appl. No.: 649,951

[22] Filed: Feb. 4, 1991

[30] Foreign Application Priority Data

Feb. 8, 1990 [JP] Japan .................................. 2-29326

[51] Int. Cl.$^5$ .............................................. F28F 21/08
[52] U.S. Cl. .................................. 428/654; 165/180; 165/905
[58] Field of Search ................ 428/607, 654; 165/180, 165/905

[56] References Cited

U.S. PATENT DOCUMENTS

| | | | |
|---|---|---|---|
| 3,168,381 | 2/1965 | Finnegan et al. | 628/654 |
| 3,891,400 | 6/1975 | Robinson | 428/654 |
| 4,098,957 | 7/1978 | Vernam et al. | 428/654 |
| 4,146,163 | 3/1979 | Anderson et al. | 428/654 |
| 4,146,164 | 3/1979 | Anderson et al. | 428/654 |
| 4,161,553 | 7/1979 | Vernam et al. | 428/654 |
| 4,209,059 | 6/1980 | Anthony et al. | 165/180 |

FOREIGN PATENT DOCUMENTS

| | | |
|---|---|---|
| 59-100250 | 6/1924 | Japan ................................ 428/654 |
| 49-53147 | 5/1974 | Japan ................................ 428/654 |
| 58-54909 | 12/1983 | Japan . |
| 59-83741 | 5/1984 | Japan ................................ 428/654 |
| 59-85364 | 5/1984 | Japan . |
| 1125203 | 8/1968 | United Kingdom . |
| 84/00129 | 1/1984 | World Int. Prop. O. .......... 428/654 |

*Primary Examiner*—John J. Zimmerman
*Attorney, Agent, or Firm*—Parkhurst, Wendel & Rossi

[57] ABSTRACT

A vacuum-brazing aluminum cladding material consisting of a core member and a first and a second clad which cover at least one surface of the core member. The first clad consists of 6-14% by weight of Si, 0-0.6% by weight of Mg and the balance being at least Al, and the second clad formed on the first clad consists of 0-14% by weight of Si, 0.8-2.5% by weight of Mg and the balancing being at least Al. The second clad has a thickness of at least 5"m, and this thickness and a content of Si determined so as to satisfy a formula $t \leq |100/(10-c)|$, wherein, "t" is the thickness (μm) of said second alloy clad, and "c" is the content (% by weight) os Si of the second clad.

14 Claims, 2 Drawing Sheets

VACUUM-BRAZING ALUMINUM CLADDING MATERIAL CONSISTING OF AL OR AL ALLOY CORE AND TWO SUPERPOSED ALUMINUM ALLOY CLADS WHICH COVER AT LEAST ONE SURFACE OF THE CORE

BACKGROUND OF THE INVENTION

1. Field of the Invention

The present invention relates to a vacuum-brazing aluminum cladding material consisting of an aluminum or aluminum alloy core member and aluminum alloy clads covering at least one of opposite surfaces of the core member, and more particularly to such vacuum-brazing aluminum alloy clads which are suitably used for producing a hollow structure with high vacuum brazing stability, and with reduced amount of Mg vaporizing in a brazing furnace.

2. Discussion of the Prior Art

A vacuum brazing process is known as one method of brazing of Al or Al alloy materials or workpieces, without a brazing flux. The vacuum brazing process uses as a filler metal an Al-Si brazing alloy which contains about 1.0–2.0% of Mg, which is heated in a brazing chamber or furnace under vacuum or at a sub-atmospheric pressure. This vacuum brazing process is widely practiced for fabricating a hollow structure or assembly such as a heat exchanger. The vacuum brazing process is generally recognized as a brazing process wherein Mg contained in the brazing alloy and vaporized in the vacuum brazing furnace functions as a getter to absorb residual oxidizing gases in the furnace, and also destroys an oxide film on the surface of the brazing alloy upon vaporization of Mg, whereby the aluminum or aluminum alloy workpieces can be brazed together under vacuum with the brazing alloy. Usually, the vacuum-brazing alloy is provided in the form of a cladding layer or layers which cover one or both surfaces of an aluminum alloy core member of a brazing sheet consisting of an aluminum alloy of the JIS-(Japanese Industrial Standard) A-3003, for example. That is, the brazing sheet consists of the core member and the cladding alloy layer or layers covering the core member. The brazing sheet does not require any special pre-brazing treatment, namely, simply requires a degreasing treatment before the brazing sheet is used.

However, the vacuum brazing process utilizing such conventional brazing sheet suffers from potential drawbacks as described below.

First, the Mg component vaporized from the brazing sheet at the elevated brazing temperature tends to be deposited and accumulated on the wall of the brazing chamber or furnace, and the deposited Mg component absorbs oxidizing gases when the furnace is exposed to the atmosphere. When the brazing furnace is again heated, the absorbed oxidizing gases are released from the deposited Mg component, deteriorating the brazing condition in the furnace. Consequently, the deposited Mg component should be removed from the furnace at regular intervals. In practice, it is necessary to accomplish a small-scale cleaning of the brazing furnace on a routine basis before each brazing job, a medium-scale cleaning every several weeks of the brazing operation, and a large-scale cleaning involving disassembling of the furnace, one or two times each year. This cleaning procedure is cumbersome and lowers the brazing efficiency.

While the need for the cleaning operation of the brazing furnace may be reduced by reducing the content of the Mg component contained in the brazing alloy, it is difficult to reduce the Mg content without deteriorating the brazability of the brazing alloy, since the sufficient brazing stability may be obtained with the Mg content being normally about 1.5% and at least 1.0% under any condition. It is considered that the required Mg content of the brazing alloy may be more or less reduced by placing a Mg or Mg alloy ingot as a getter in the brazing furnace. However, the use of the Mg ingot as the getter actually results in increasing the overall amount of the Mg component vaporized in the brazing furnace.

A second drawback of the vacuum brazing process using the conventional brazing sheet occurs when the brazing sheet is used for manufacturing a hollow structure or assembly such as a drawn cup type of heat exchanger or radiator tank, which has joints formed in brazing on both inner and outer sides of the structure. That is, the vaporizing rate of the Mg component of the ordinary conventional brazing sheets is different on the inner and outer sides of the hollow structure to be produced, whereby the brazability is deteriorated, in particular, on the inner side of the hollow structure. Although reducing the Mg content of the brazing alloy is effective to improve the brazability on the inner side of the hollow structure to be produced, it is difficult to reduce the Mg content while maintaining the Mg content within a range which assures sufficient brazability on the outer side of the structure.

To improve the brazability in producing a hollow structure using a vacuum-brazing aluminum alloy, Publication No. 58-54909 of examined Japanese Patent Application proposes a brazing sheet in which the Mg content of the brazing alloy for the inner side of the structure is controlled within a range between 0.2% and 1.2%. Further, laid-open Publication No. 59-85364 of unexamined Japanese Patent Application proposes a brazing sheet in which the Mg content of the brazing alloy for the inner side of the hollow structure is zeroed. However, the two proposed brazing sheets indicated above still suffer from low brazability on the outer side of the hollow structure, since a portion of the brazing alloy for the inner side flows to the outside of the structure, at each joint between the adjacent brazing sheets which bounds the hollow inside and the outside of the structure.

The above proposed brazing sheets should be correctly oriented with respect to each other so that the brazing alloy clad layers on the brazing sheets are suitably positioned in relation to the inside and outside of a hollow structure to be produced. This orientation requirement makes it difficult to control the inventory of the brazing sheets and apply the brazing sheets to an automated brazing line. Therefore, the proposed brazing sheets do not provide a practically effective solution to the conventionally experienced problem.

SUMMARY OF THE INVENTION

It is accordingly an object of the present invention to provide a vacuum-brazing aluminum cladding material which permits reduction in the amount of the Mg component vaporized in a brazing furnace, and consequent reduction in the need for cleaning maintenance of the brazing furnace, and which assures excellent brazability in producing a brazed hollow structure.

The above object may be accomplished according to the principle of the present invention, which provides a vacuum-brazing aluminum cladding material consisting of a core member of aluminum or aluminum alloy, and a first clad and a second clad formed on the first clad, which first and second clads cover at least one of opposite surfaces of said core member. The first clad consists of 6–14% by weight of Si, 0–0.6% by weight of Mg and the balance being at least Al. The second clad consists of 0–14% by weight of Si, 0.8–2.5% by weight of Mg and the balancing being at least Al. Further, the second clad has a thickness of at least 5 μm, and this thickness and a content of Si of the second clad are determined so as to satisfy a formula $t \leq |100/(10-c)|$, wherein, "t" (μm) represents the thickness of the second clad, while "c" represents the content (% by weight) of Si of the second clad.

In understanding the present invention, it is noted that the amount of the residual oxidizing gases and the rate of vaporization of the Mg component is different on the inner and outer sides of a hollow structure to be produced by using a vacuum-brazing aluminum alloy. Accordingly, the content of Mg that should be included in the aluminum alloy used as a filler metal for vacuum brazing is different between the aluminum alloys for the inside and outside of the hollow structure.

The aluminum alloy for the outside of the hollow structure is likely to be exposed to the oxidizing gases which exist in a relatively large amount in the brazing chamber or furnace. Therefore, it is necessary to provide a getter for absorbing the residual oxidizing gases. As long as the getter functions to a sufficient extent, a sufficiently high degree of brazability of the brazing aluminum alloy can be generally obtained on the outer side of the structure, without the alloy containing Mg. This is confirmed by a large number of experiments and practical production of vacuum-brazed hollow structures. That is, for assuring excellent brazability on the outer side of a hollow structure, it is necessary to either permit the Mg component of the brazing aluminum alloy to be abundantly vaporized immediately before the brazing to thereby destroy the oxide film on the surface of the brazing alloy, or alternatively prevent re-oxidation of the surface of the brazing alloy until the brazing is started.

On the other hand, the amount of the residual oxidizing gases is smaller on the inner side of the hollow structure than on the outer side, and the need for providing the getter is comparatively low on the inner side. Similarly, the needs for destruction of the oxide film and prevention of the re-oxidation of the brazing aluminum alloy are comparatively low for the alloy used on the inner side of the structure. What is more important for the aluminum alloy on the inner side of the structure is to avoid early exhaustion or depletion of the alloy. To this end, it is necessary and important to control the fusion and flow of the alloy on the inner side such that the fusion and flow of the inner side alloy are initiated concurrently with those of the outer side alloy, to an extent as much as possible, without deteriorating the brazability on the outer side of the hollow structure.

Described more particularly, where the Mg content of a vacuum-brazing aluminum alloy for a hollow structure is relatively high as in the conventional brazing alloy, the complete discharging of the vaporized Mg on the inner side of the structure tends to be retarded, and a relatively large amount of the Mg component remains in the brazing alloy on the inner side, than in the brazing alloy on the outer side on which the Mg component continues to be vaporized at a relatively high rate. Consequently, the fusion and flow of the inner side alloy are initiated at an earlier time due to eutectic reaction of the three elements Al, Si and Mg of the alloy, than those of the outer side alloy. This causes a flow of a substantial portion of the inner side alloy toward the outer side of the hollow structure, undesirably causing early exhaustion or depletion of the alloy on the inner side, and consequent defects such as poor formation or absence of a fillet on the inner side of a joint.

To satisfy the different requirements of the vacuum-brazing aluminum alloy on the inner and outer sides of the hollow structure, the present invention was developed in an effort to permit the brazing alloy to initiate the fusion and flow at substantially the same time on both inner and outer sides of the hollow structure. That is, the vacuum-brazing cladding material according to the present invention includes a first and a second clad superposed on each other on an aluminum or aluminum alloy core material. The first clad formed in contact with the core material has a relatively low Mg content than the second clad formed on the first clad, so as to eliminate or minimize a time difference between the initiation of the fusion and flow of the inner side alloy and that of the outer side alloy, and to permit vaporization of the Mg component in a sufficiently large amount for absorbing the oxidizing gases and destroying the oxide film on the surface of the brazing alloy, for thereby assuring high brazability on both inner and outer sides of the hollow structure. Further, the present vacuum-brazing aluminum alloy consisting of a combination of the first clad having a relatively small Mg content and the second clad having a relatively large Mg content is also advantageous in reducing the amount of vaporization of Mg in the brazing furnace.

It will be understood from the above description that the vacuum-brazing aluminum cladding material of the present invention which is usable to provide brazing sheets permits significant reduction in the overall amount of vaporization of Mg from the brazing sheets during manufacture of a brazed article from the brazing sheets, since the first clad of the vacuum-brazing aluminum cladding material contains a relatively small amount of Mg. Accordingly, the amount of Mg deposited on the wall of the brazing furnace is reduced, to thereby reduce the need for cleaning the brazing furnace. Further, the present aluminum cladding material for vacuum-brazing permits a comparatively large number of products to be prepared at one time within the brazing furnace, thereby increasing the production efficiency.

Since the brazability of the brazing alloy is effectively improved on both inner and outer sides of each joint of a hollow structure, the produced hollow structure does not suffer from fluid leaking or insufficient pressure tightness as encountered on a heat exchanger or other hollow structure produced by using the conventional brazing sheet (using the conventional vacuum-brazing aluminum alloy).

Further, the use of the present vacuum-brazing aluminum cladding material does not require restricting the rate of rise of the brazing temperature for the purpose of promoting the vaporization of Mg on the inner side of the hollow structure. Rather, the brazing stability of the present brazing alloy can be enhanced by increasing the rate of rise of the brazing temperature, whereby the brazing efficiency is improved in this respect, too.

Moreover, where the present vacuum-brazing aluminum cladding material is used as brazing sheets whose core member is covered on both sides thereof by the aluminum alloy, there is no need to distinguish one side of each brazing sheet from the other side in orienting the brazing sheet, whereby the inventory of the brazing sheet can be easily controlled, and the brazing sheet can be suitably processed in an automated line which includes a step of forming or drawing the brazing sheets before the formed brazing sheets are assembled into a desired structure by vacuum brazing.

BRIEF DESCRIPTION OF THE DRAWINGS

The above and optional objects, features and advantages of the present invention will be better understood by reading the following detailed description of the present invention and the following description of examples of the invention, when considered in connection with the accompanying drawings, in which.

DETAILED DESCRIPTION OF THE INVENTION

Figure 1:
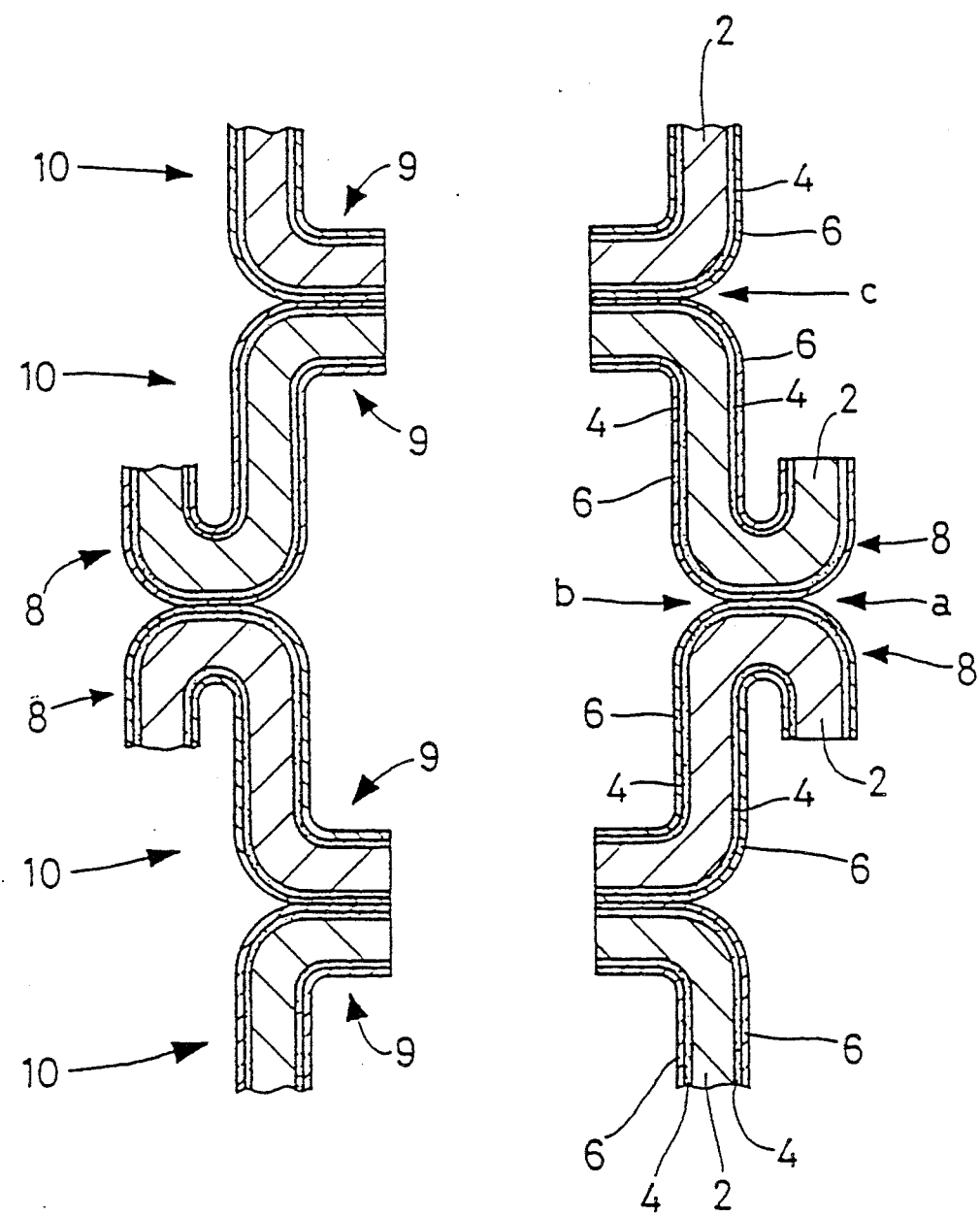
FIG. 1 is a fragmentary elevational view in cross section of an example of an assembly consisting of drawn cup-shaped members, which constitutes a part of an evaporator.

Referring to the fragmentary cross sectional view of FIG. 1, an example of a hollow structure in the form of a drawn cup type of evaporator is produced from brazing sheets whose core members are covered by the vacuum-brazing aluminum alloy according to the present invention. More specifically, the hollow structure consists of a plurality of cup-shaped members 10 which are superposed on each other in a stack. Each cup-shaped member 10 is formed from a multi-layered brazing sheet according to the present invention, which consists of a planar core 2 of aluminum or aluminum alloy, and two vacuum-brazing aluminum alloy layers which cover the opposite surfaces of the planar core 2, respectively. Each of the two aluminum alloy layers consists of a first clad 4 which is formed on the core 2 and which includes a relative small content of Mg, and a second clad 6 which is formed on the first clad 4 and which includes a relatively large content of Mg. Each formed brazing sheet, namely, each cup-shaped member 10 has a flange 8 formed along the periphery at its open end, and a flat bottom wall 9, so that the adjacent cut-shaped members 10, 10 one inverted with respect to the other are brazed together at the flanges 8, 8 and bottom walls 9, 9 in abutting contact with each other as shown in FIG. 1, so as to form a hollow structure.

The entire outer surface of the hollow structure is given by the second clads 6 of the formed brazing sheets or cup-shaped members 10, so that the Mg component is abundantly or vigorously vaporized from the second clads 6, whereby the vaporized Mg component serves as a getter for sufficiently absorbing the residual oxidizing gases within a brazing chamber or furnace. The outer sides (indicated at "a" and "c") of the joints are provided by the second clads 6, and the oxide film formed on these second clads 6 can be effectively destroyed by the abundantly vaporized Mg component, so as to assure flawless formation of a fillet on the outer side "a", "c" of each brazed joint.

Further, the entire inner surface of the hollow structure is also given by the second clads 6 of the cup-shaped members 10, and the inner sides (indicated at "b" in FIG. 1) of each joint are provided by the second clads 6. Since the second clads 6 are formed on the respective first clads 4 and since the content of Mg of the first clads 4 is comparatively small, the initiation of fusion and flow of the brazing aluminum alloy on the inner side of the hollow structure is effectively retarded, whereby the early exhaustion or depletion of the brazing aluminum alloy on the inner side is effectively prevented. Consequently, a flawless fillet is formed on the inner side "b" of each brazed joint. Thus, the brazing sheets including the first and second clads 4, 6 according to the principle of the present invention assures excellent brazability on both inner and outer sides of the hollow structure to be produced.

The first clad 4 on each side of the brazing sheet or cup-shaped member 10 is an aluminum alloy containing 6-14% by weight of Si, and 0-0.6% by weight of Mg. If the Si content of the first clad 4 is less than 6%, the fluidity of the brazing aluminum alloy is insufficient. If the Si content exceeds 14%, the aluminum or its alloy of the core 2 is excessively eroded by the Si component. If the Mg content of the first clad 4 exceeds 0.6%, the first clad 4 cannot effectively function to reduce a time difference between the initiation of fusion and flow of the inner side aluminum alloy and that of the outer side aluminum alloy.

On the other hand, the second clad 6 on the first clad 4 is an aluminum alloy containing 0-14% by weight of Si and 0.8-2.5% by weight of Mg. If the Si content of the second clad 6 exceeds 14% or if the Mg content exceeds 2.5%, the brazing sheet tends to be easily cracked during a forming operation (a drawing operation to prepare the cup-shaped member 10). If the Mg content of the second clad 6 is less than 0.8% or if the thickness of the second clad 6 is less than 5 μm, the brazability of the aluminum alloy on the outer side of the hollow structure is deteriorated.

It is noted that the first and second clads 4, 6 may contain elements other than Al, Si and Mg, to improve the properties of the vacuum-brazing aluminum alloy, as well known in the art. For instance, the clads 4, 6 may contain at least one additional element such as Pb, Sn, Ni, Cu, Zn, Be, Li and Ge, for example, about 0.1-10% by weight of Zn to improve the corrosion resistance of the alloy.

If the second clad 6 is contemplated to primarily function as a getter to absorb the residual oxidizing gases and destroy the oxide film, Si may be totally absent in the second clad 6. Where the ratio of the thickness of the second clad 6 to the total thickness of the brazing alloy 4, 6 is relatively high, namely, where the second clad 6 has a sufficiently large amount functioning as a brazing filler metal, the inclusion of the Si component in the second clad 6 is essential to assure sufficient fluidity of the brazing filler metal. In other words, if the Si content of the second clad 6 is negligible or substantially zero, the thickness of the second clad 6 should be determined to be small enough to prevent the second clad from functioning as the brazing filler metal. If the Si content of the second clad 6 is sufficiently large, the second clad 6 may have a high degree of freedom in determining its thickness. That is, the principle of the present invention requires the following formula to be satisfied in determining the thickness "t" (μm) and the Si content "c" (wt. %) of the second clad 6:

$$t \leq |100/(10-c)|$$

It will be understood from the above formula that the thickness "t" of the second clad 6 that can be selected increases as the Si content "c" approaches 10%. That is, the freedom in determining the thickness of the second clad 6 increases with a decrease in a difference of the Si content from the reference value of "10%". In this respect, the Si content of the second clad 6 is desirably near 10% by weight.

While the present invention has been described as the vacuum-brazing aluminum alloy as applied to a brazing sheet in which the opposite surfaces of an aluminum or aluminum alloy core are both covered by the first and second clads 4, 6, the principle of the present invention is equally applicable to a brazing sheet in which only one surface of the core is covered by the superposed first and second clads 4, 6 of the aluminum alloy. In this case, too, the advantages of the present invention as described above may be enjoyed.

EXAMPLES

To further clarify the present invention, examples of the invention will be given below for illustrative purpose only. It is to be understood that the invention is not limited to the details of the following examples.

It is also to be understood that the present invention may be embodied with various changes, modifications and improvements which may occur to these skilled in the art, in view of the foregoing detailed description and the following examples, without departing from the spirit and scope of the invention defined in the appended claims.

Figure 2:
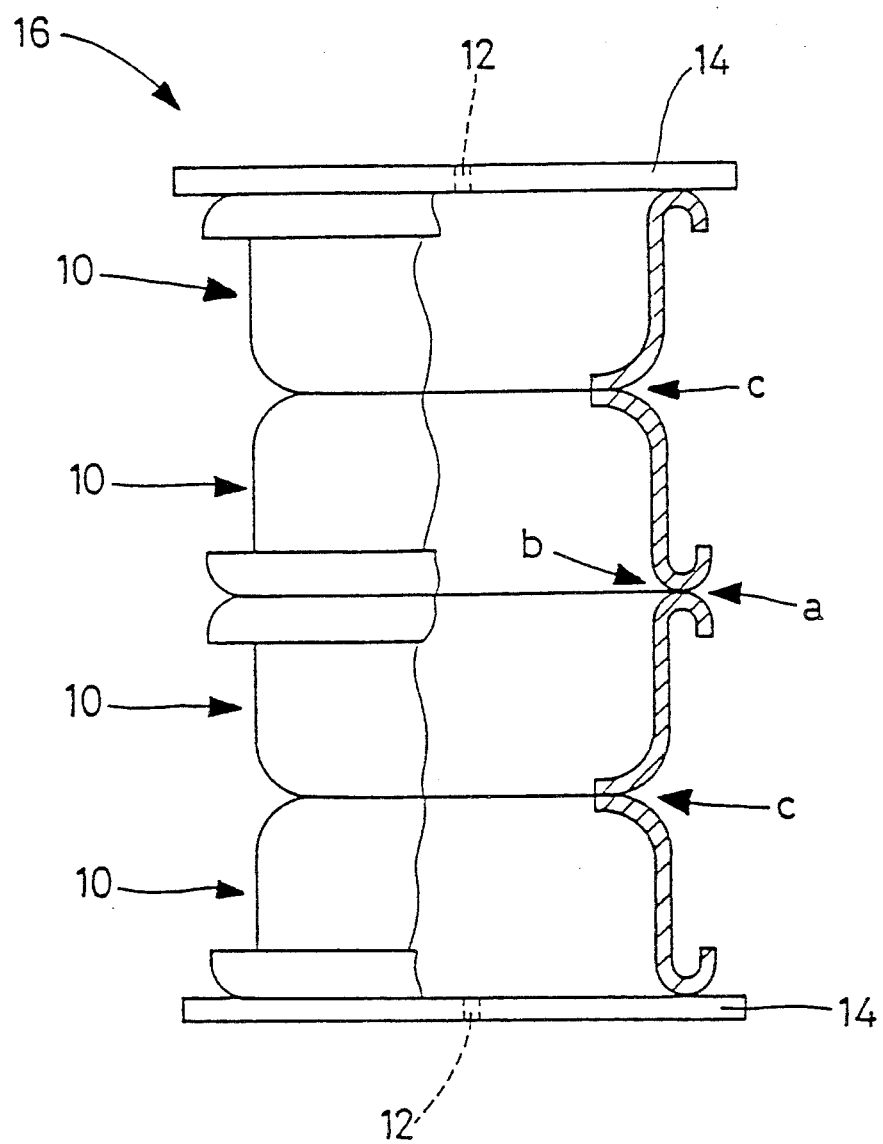
FIG. 2 is a partially cut-away elevational view of a stacked assembly of drawn cup-shaped members in the form of an evaporator, which was manufactured using vacuum-brazing aluminum sheet according to Examples of the present invention.

To prepare the various examples, brazing sheets having a thickness of 0.6 mm were produced. Each brazing sheet consists of an aluminum alloy core member according to the JIS A-3003, and a vacuum-grazing aluminum alloy according to the present invention which constitutes a 15% portion of the entire brazing sheet. The aluminum alloy covers both sides of the core member. The vacuum-brazing aluminum alloy consists of superposed first and second clads which cover each of the opposite surfaces of the core sheet. The details of the first and second clads in each Example are indicated in Table 1. Each brazing sheet was formed into a cup-shaped member 10 as shown in FIG. 2. The four cup-shaped members 10 were superposed on each other in abutting contact with each other at their flange portions and bottom walls. The thus prepared stack of the cup-shaped members 10 was interposed between two stainless steel discs 14 disposed at the upper and lower ends of the stack. Each disc 14 has a central vent hole 12. Thus, a stacked hollow assembly 16 as shown in FIG. 2 was prepared for each of the different examples.

Then, each stacked hollow assembly 16 was placed in a stainless steel brazing chamber having an inner volume of 5000 ml (0.005 m³), after the chamber was sufficiently degased. The stacked hollow assembly 16 was then subjected to a vacuum brazing operation for three minutes in the brazing chamber, at 600° C. at a reduced pressure of $5 \times 10^{-5}$ Torr.

The thus vacuum-brazed stacked hollow assemblies 16 were inspected for the poor formation or lack of fillets on the outer side (indicated at "a" and "c" in FIG. 2) and the inner side (indicated "b") of each brazed joint, to evaluate the brazability on the outer and inner sides of the hollow assemblies. Further, the weights of the produced hollow assemblies 16 were measured before and after the brazing operation, to calculate the weight loss which was caused by the amount of the Mg component released into the brazing chamber. Some of the brazed products were observed at a surface cut through the joint. The results of the inspection, measurement and observation are indicated in Table 1.

For comparison, Comparative Example (1), (2) and (3) were prepared. Table 1 also indicate the brazing aluminum alloys used in these comparative examples, and the results thereof.

It will be understood from Table 1 that no poor fillets were developed on the inner and outer sides of the brazed joints in the examples according to the present invention. This indicates high brazing stability of the present vacuum-brazing aluminum alloy as applied to a brazing sheet whose opposite surfaces are cladded by the aluminum alloy. It is noted that the brazed products according to the present invention experienced considerably reduced weight losses due to the Mg component released into the brazing chamber, as compared with those according to Comparative Example (1) which use only the first clad.

While Comparative Examples (2) use both the first clad and the second clad as in the present invention, the contents of Si and Mg are outside the specified ranges according to the present invention. Regarding the product prepared from the brazing sheets whose Si content of the first clad exceeds 14%, the aluminum or its alloy of the core was considerably eroded by the Si component at and near the joints of the product. The product prepared from the brazing sheets whose Si content of the first clad is less than 6% had poor fillets on both inner and outer sides of the joints, due to shortage of the Si component as the brazing filler. The product prepared from the brazing sheets whose Mg content of the first clad exceeds 0.6% had poor fillets on the inner side of the joints.

TABLE 1

| First Clad | | | Second Clad | | | | | |
|---|---|---|---|---|---|---|---|---|
| Si (wt %) | Mg | Thickness (μm) | Si (wt %) | Mg | Thickness (μm) | Poor Fillets | Weight Loss (mg) | Note |
| PRESENT INVENTION | | | | | | | | |
| 9.9 | 0 | 75 | 9.8 | 0.8 | 15 | NONE | 2 | |
| 9.9 | 0 | 73 | 9.8 | 1.4 | 16 | NONE | 4 | |
| 9.9 | 0 | 76 | 9.7 | 2.5 | 16 | NONE | 7 | |
| 9.9 | 0 | 75 | 13.9 | 1.4 | 14 | NONE | 5 | |
| 9.7 | 0.6 | 74 | 9.8 | 0.8 | 17 | NONE | 10 | |
| 9.7 | 0.6 | 75 | 9.8 | 1.4 | 17 | NONE | 12 | |
| 9.7 | 0.6 | 76 | 9.7 | 2.5 | 15 | NONE | 14 | |
| 6.1 | 0 | 74 | 9.8 | 1.4 | 17 | NONE | 5 | |
| 13.8 | 0 | 74 | 9.8 | 1.4 | 16 | NONE | 4 | |
| 9.9 | 0 | 84 | 9.8 | 0.8 | 5 | NONE | 1 | |
| 9.9 | 0 | 60 | 9.9 | 2.2 | 31 | NONE | 13 | |
| 9.9 | 0 | 86 | 0 | 1.5 | 10 | NONE | 2 | |
| COMPARATIVE EXAMPLE (1) | | | | | | | | |
| 9.8 | 1.4 | 91 | — | — | — | INSIDE | 23 | |
| 9.8 | 1.5 | 89 | — | — | — | INSIDE | 25 | *1 |
| COMPARATIVE EXAMPLE (2) | | | | | | | | |
| 15.1 | 0 | 74 | 9.8 | 1.4 | 16 | NONE | 3 | *2 |
| 5.2 | 0 | 76 | 9.8 | 1.4 | 15 | YES | 5 | *3 |
| 9.8 | 0.8 | 74 | 9.8 | 1.4 | 16 | INSIDE | 15 | |
| 9.9 | 0 | 75 | 15.1 | 0 | 16 | — | — | *4 |
| 9.9 | 0 | 75 | 9.6 | 2.8 | 15 | — | — | *5 |
| 9.9 | 0 | 74 | 9.7 | 0.6 | 16 | OUT- | 2 | |

TABLE 1-continued

| First Clad | | | Second Clad | | | | | |
|---|---|---|---|---|---|---|---|---|
| Si (wt %) | Mg | Thickness (μm) | Si (wt %) | Mg | Thickness (μm) | Poor Fillets | Weight Loss (mg) | Note |
| COMPARATIVE EXAMPLE (3) SIDE | | | | | | | | |
| 9.9 | 0 | 88 | 9.8 | 1.4 | 3 | OUT-SIDE | 1 | |
| 9.9 | 0 | 76 | 0 | 1.5 | 15 | OUT-SIDE | 2 | |
| 9.9 | 0 | 59 | 0 | 1.5 | 30 | YES | 5 | *6 |

Note *1: The first clad includes 0.1% of Bi.
Note *2: The aluminum or its alloy of the core was considerably eroded.
Note *3: The poor fillets appeared on both outer and inner sides of the joints.
Note *4: The cup-shaped members 10 cracked during drawing operation.
Note *5 Same as Note *4
Note *6: The poor fillets appears on both outer and inner sides of the joints.

Further, the product prepared from the brazing sheets whose Si content of the second clad exceeds 14%, and the product prepared from the brazing sheets whose Mg content exceeds 2.5%, both suffered from cracking during a drawing operation to form the cup-shaped members 10. The product prepared from the brazing sheets whose Mg content of the second clad is less than 0.8% had poor fillets on the outer side of the joints.

Regarding Comparative Examples (3), the product prepared from the brazing sheets whose thickness of the second clad is less than 5 μm had poor fillets on the outer side of the joints, and the products prepared from the brazing sheets whose second clads do not contain Si and have thicknesses larger than 10 μm had the poor fillets due to low brazability of the aluminum alloy. In the latter two cases, the formula indicated above is not satisfied.

What is claimed is:

1. A vacuum-brazing aluminum cladding material consisting of a core member of aluminum or aluminum alloy, and a first clad and a second clad formed on said first clad, which first and second clads cover at least one of opposite surfaces of said core member, said first clad consisting essentially of 6-14% by weight of Si, 0-0.6% by weight of Mg and the balance being at least Al, said second clad consisting essentially of 0-14% by weight of Si, 0.8-2.5% by weight of Mg and the balancing being at least Al, said second clad having a thickness of at least 5 μm, and said thickness and a content of Si of said second clad being determined so as to satisfy the following formula:

$$t \leq |100/(10-c)|$$

wherein,
t = thickness (μm) of said second clad; and
c = content (% by weight) of Si of said second clad.

2. A vacuum-brazing aluminum cladding material according to claim 1, wherein said content of Si of said second clad is selected within a range between 9.7% and 9.9%.

3. A vacuum-brazing aluminum alloy according to claim 1, wherein said content of Si of said second clad is zero.

4. A vacuum-brazing aluminum cladding material according to claim 1, wherein said thickness of said second clad is selected within a range between 5 μm and 1 μm.

5. A vacuum-brazing aluminum cladding material according to claim 4, wherein said thickness of said second clad is selected within a range between 10 μm and 17 μm.

6. A vacuum-brazing aluminum cladding material according to claim 1, wherein said first clad has a thickness between 73 μm and 86 μm.

7. A vacuum-brazing aluminum cladding material according to claim 1, wherein said first clad consisting of 6-14% by weight of Si, 0-0.6% by weight of Mg and the balance consisting of aluminum and at least one of an element selected from the group consisting of Pb, Sn, Ni, Cu, Zn, Be, Li and Ge.

8. A vacuum-brazing aluminum cladding material according to claim 7, wherein said balance of said first clad contains 0.1-10% by weight of Zn.

9. A vacuum-brazing aluminum cladding material according to claim 1, wherein said second clad consisting of 0-14% by weight of Si, 0.8-2.5% by weight of Mg and the balance consisting of Al and at least one of an element selected from the group consisting of Pb, Sn, Ni, Cu, Zn, Be, Li and Ge.

10. A vacuum-brazing aluminum cladding material according to claim 9, wherein said balance of said second clad contains 0.1-10% by weight of Zn.

11. An article comprising at least two formed members each of which is formed of a vacuum-brazing aluminum cladding material as defined in claim 1, said at least two formed members being assembled together by vacuum brazing a said first and second clads.

12. An article according to claim 11, wherein said at least two formed members consist of at least two cup-shaped members each of which has a flange portion and a bottom wall and which are vacuum-brazed at said flange portions and said bottom walls thereof, such that said bottom walls partially define a hollow formed in the article.

13. An article according to claim 12, wherein said flange portions of adjacent ones of said at least two cup-shaped members define a joint formed by vacuum brazing, which joint bounds said hollow and an outside of the article.

14. An article according to claim 12, which constitutes a part of an evaporator.

* * * * *